Nov. 17, 1931.                A. W. MEYER                1,831,923
                                PERCOLATOR
                            Filed May 19, 1930
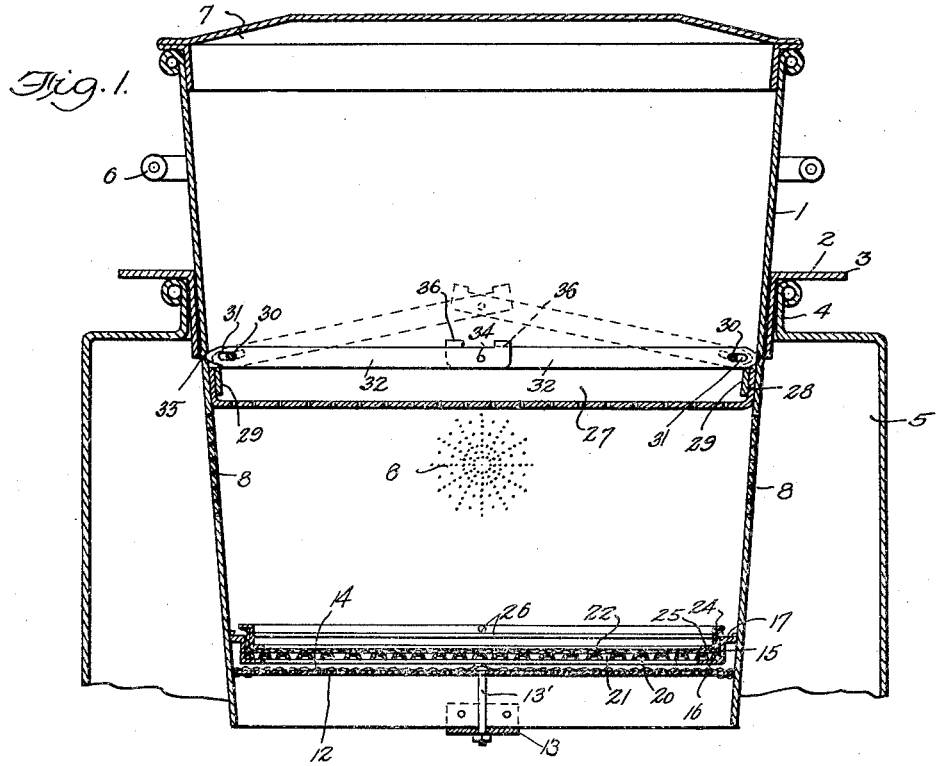
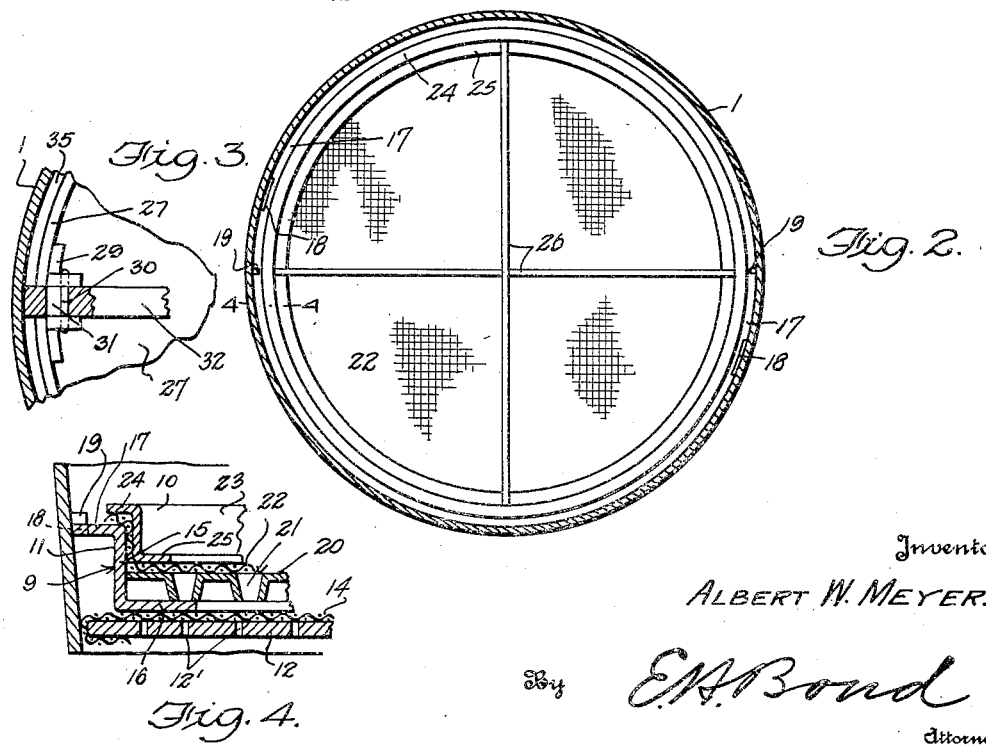
Inventor
ALBERT W. MEYER.
By E. H. Bond
  Attorney Patented Nov. 17, 1931

1,831,923

UNITED STATES PATENT OFFICE

ALBERT W. MEYER, OF NEW YORK, N. Y.

PERCOLATOR

Application filed May 19, 1930. Serial No. 453,772.

This invention relates to percolators, and more particularly to a percolator adapted for use in connection with a large coffee urn of the type used in lunch rooms and other places where large quantities of coffee are made.

One object of the invention is to provide a percolator adapted to be applied to coffee urns having a neck at their upper ends of different diameters and permit the percolator to be firmly seated when set in place.

Another object of the invention is to so form the percolator that coffee may be confined in the body portion thereof between a coffee support and water strainer and water permitted to pass through the coffee without disturbing the coffee and causing fine grounds to be carried through the coffee support into the coffee urn.

Another object of the invention is to provide a coffee support which will very effectively support coffee while at the same time allowing water to pass through the coffee into the urn.

Another object of the invention is to permit the coffee support to be firmly held in an assembled position for use and also allow it to be taken apart and thoroughly cleaned.

Another object of the invention is to provide an improved type of water strainer adapted to be set into the body portion of the percolator above the coffee support and releasably secured in a set position.

The invention is illustrated in the accompanying drawings, wherein:

Figure 1 is a vertical sectional view through the improved percolator.

Figure 2 is a transverse sectional view taken along the line 2—2 of Figure 1.

Figure 3 is an enlarged fragmentary sectional view taken along the line 3—3 of Figure 1.

Figure 4 is an enlarged fragmentary sectional view taken along the line 4—4 of Figure 2.

The body portion or receptacle 1 of this improved percolator tapers towards its lower end so it has a wedging fit within a collar 2, and this collar is formed with an outstanding flange 3 so that, when set into the neck 4 of a coffee urn 5, the flange will rest upon the upper edge of the neck and support the percolator in the urn as shown in Figure 1. By this arrangement the percolator may be supported in coffee urns having necks of different diameters. Handles 6 are provided so that the percolator may be easily set in place or removed, and its upper end is closed by a cover 7 of a conventional construction. The walls of the body or receptacle are perforated in spaced relation to its open lower end as shown at 8, so that water may pass outwardly through the walls and flow downwardly therefrom into the urn, as well as passing through a coffee support mounted in the receptacle near the open lower end thereof.

The coffee support indicated in general by the numeral 9 consists of upper and lower sections 10 and 11 disposed one immediately above the other, as shown in Figures 1 and 4. The lower section consists of a stiff metal plate or disk 12 having small perforations 12′ formed therein, and the upper face of the disk is covered by a fabric sheet 14, the marginal portions of which are folded about edges of the disk and either sewed to the disk or held in place by being clamped between the disk and walls of the receptacle. This sheet can be easily removed from the disk and thoroughly cleaned. A bolt 13′ passed through the disk and through a yoke 13 firmly holds the disk in place in the body.

The upper section of the support rests upon the lower section and includes a ring or collar 15 having a lower inwardly extending flange 16 and upper outstanding flange 17. Notches 18 are formed in the flange 17 and lugs 19 project from the walls of the body which pass through the notches when the upper section is first set in place and overlap the flange to hold the coffee support in place, when a partial rotation is imparted to the upper section. A rigid metal disk 20 fits with the collar and has portions punched downwardly therefrom to form downwardly tapered water passages 21 through which water passes after seeping through a fabric sheet 22, which rests upon the disk 20 and has marginal portions clamped against the collar 15 and its flange 17 by a securing ring 23. This ring fits snugly within the collar and has upper and lower flanges 24 and 25 which assist in holding the sheet firmly in place. Rods 26 are provided to brace the ring 23 and permit it to be easily withdrawn when it is desired to take the upper section apart for cleaning. These rods also are to be grasped when it is desired to rotate the upper section and secure it within the body or remove it.

After coffee has been poured into the receptacle until the side openings 8 are covered and has been evenly distributed, a water strainer 27 is set in place and serves to confine coffee when water is poured into the percolator, as well as causing the water to be delivered to the coffee in fine streams. Part of the water seeps entirely through the coffee to the coffee support and passes through the support, while other portions of the water passes outwardly through the groups of perforations 8.

The strainer consists of a perforated disk having upturned marginal walls 28, and against diametrically opposed portions of the walls are secured bearing brackets 29 carrying pins 30 which pass through slots 31 formed longitudinally in arms 32. These arms project through notches 33 formed in the walls of the strainer and when the inner ends of the arms which are pivoted to each other by a pin 34 are forced downwardly, the outer ends of the arms engage in an internal groove or seat 35 formed in the walls of the body 1 and securely, but releasably, hold the strainer in a set position. Fingers 36 are provided at the inner ends of the arms to limit their downwardly movement.

Perforated metal or fabric, as may be desired, may be used for the bottoms of the receptacles.

Various modifications in detail may be resorted to without departing from the spirit of the invention.

What I claim is:—

1. A percolator comprising a receptacle open at its top and bottom, a coffee support in said receptacle adjacent the lower end thereof, a perforated water strainer in said receptacle bearing against walls thereof above the coffee support in spaced relation thereto and adapted to rest upon coffee placed in the receptacle upon the coffee support, and securing means for said strainer carried by the strainer and movable into and out of position to engage the walls of the receptacle and removably secure the strainer in an adjusted position.

2. A percolator comprising a receptacle open at its top and bottom, means to support said receptacle in a coffee urn in spaced relation to the walls thereof, a coffee support in said receptacle adjacent the lower end thereof, and a perforated water strainer removably secured against walls of said receptacle above the coffee support in position to bear against coffee in the receptacle, the receptacle having its side walls formed with perforations below the strainer.

3. A percolator comprising a body open at its top and bottom, means to support the body in a coffee urn, a coffee support in said body having upper and lower sections, said upper section resting upon the lower section and including a disk formed with water passages, a sheet of fabric covering the disk, binding rings to secure the sheet and disk together, said rings fitting one within the other in gripping engagement with marginal portions of the fabric sheet, one ring having a portion engaging the marginal portion of the under face of the disk and the other ring having a portion overlapping the upper face of the disk, means to releasably secure the upper section in the body, and a water strainer mounted in said body above the coffee support.

4. A percolator comprising a body open at its top and bottom, means to support the body in a coffee urn, a coffee support in said body having upper and lower sections, said upper section resting upon the lower section and including a disk formed with water passages, a sheet of fabric covering the disk, a collar fitting about said disk and sheet and having a lower internal flange engaging beneath the disk and an upper external flange, a securing ring to fit within the collar and bind marginal portions of the sheet against the collar, and means to releasably secure the upper section in the body.

5. A percolator comprising a body open at its top and bottom, means to support the body in a coffee urn, a coffee support in said body having upper and lower sections, the lower section consisting of a rigid perforated disk and a fabric sheet covering the disk, said upper section resting upon the lower section and including a disk formed with water passages, a sheet of fabric covering the disk, a collar fitting about said disk and sheet and having a lower internal flange engaging beneath the disk and an upper external flange, and a securing ring to fit within the collar and bind marginal portions of the sheet against the collar.

6. A percolator comrpising a body open at its top and bottom, means to support the body in a coffee urn, a coffee support in said body, a water strainer in said body above said coffee support, said strainer consisting of a rigid perforated disk having an upwardly extending marginal flange to bear against walls of the body, bearing brackets carried by the flange in opposed relation to each other, and arms having their inner end portions pivotally connected and their outer ends pivotally and slidably connected with said brackets, the walls of the body being formed with a seat to receive the outer ends of the arms when the inner ends of the arms are forced downwardly and releasably secure the strainer in the body.

7. A percolator comprising a body open at its top, a water strainer in said body, said strainer consisting of a perforated disk having an upwardly extending marginal flange bearing against walls of the body, bearing brackets carried by said flange, pins carried by said brackets, and arms having their inner end portions pivotally connected and their outer ends formed with longitudinally extending slots receiving said pins to pivotally and slidably connect the arms with the pins whereby the outer ends of the arms may be moved into gripping engagement with walls of the body when the inner ends of the arms are forced downwardly and releasably secure the strainer in the body.

In testimony wheerof I affix my signature.

ALBERT W. MEYER.